US006890654B2

(12) United States Patent
Stupp et al.

(10) Patent No.: US 6,890,654 B2
(45) Date of Patent: May 10, 2005

(54) ENCAPSULATION OF NANOTUBES VIA SELF-ASSEMBLED NANOSTRUCTURES

(75) Inventors: Samuel I. Stupp, Chicago, IL (US); Benjamin W. Messsmore, Evanston, IL (US); Michael Scott Arnold, Evanston, IL (US); Eugene RT. Zubarev, Ames, IA (US)

(73) Assignee: Northwestern University, Evanston, IL (US)

( * ) Notice: Subject to any disclaimer, the term of this patent is extended or adjusted under 35 U.S.C. 154(b) by 161 days.

(21) Appl. No.: 10/418,474

(22) Filed: Apr. 18, 2003

(65) Prior Publication Data

US 2004/0022718 A1 Feb. 5, 2004

Related U.S. Application Data
(60) Provisional application No. 60/373,827, filed on Apr. 18, 2002.

(51) Int. Cl.[7] .................................................. B32B 5/16
(52) U.S. Cl. ...................... 428/403; 257/788; 428/323; 428/327; 428/407; 428/408; 977/DIG. 1
(58) Field of Search .................. 423/445 R, 445 B, 423/361, 402, 403, 407, 408, 323, 327; 257/788; 977/DIG. 1

(56) References Cited

U.S. PATENT DOCUMENTS 5,820,881 A     10/1998   Milstein
5,866,434 A  *  2/1999    Massey et al. ............... 436/526
6,090,363 A     7/2000    Green et al.
6,096,863 A  *  8/2000    Fields et al. ................. 530/326
6,368,877 B1 *  4/2002    Zhang et al. ............... 436/527
6,383,500 B1 *  5/2002    Wooley et al. .............. 424/401
6,491,903 B1 * 12/2002    Forster et al. ........... 424/78.01
6,712,864 B2 *  3/2004    Horiuchi et al. .............. 23/314
6,756,025 B2 *  6/2004    Colbert et al. ........... 423/447.3
6,787,122 B2 *  9/2004    Zhou ....................... 423/447.1

FOREIGN PATENT DOCUMENTS

WO          WO 00/17101       3/2000

OTHER PUBLICATIONS

Stendahl et al, "Toughening of Polymers by Self–Assembling Molecules" Adv. Mat. 2002, 14(21), 1540–43.*
Dworkin et al, "Self–assembling amphiphilic molecules: Synthesis in simulated interstellar/precometary ices", PNAS, vol. 98, No. 3, 815–819, Jan. 30, 2001.*
Bon–Choel Ku, "Self–Assembly of Amphiphilic Polyacetylenes on Multi–Walled Carbon Nanotubes", 2003 MRS Fall Meeting, Dec. 3, 2003.*

* cited by examiner

*Primary Examiner*—H. Thi Le
(74) *Attorney, Agent, or Firm*—Pepper Humilton LLP; Raymond Miller

(57) ABSTRACT

This invention is directed to encapsulated nanotubes, methods of encapsulating carbon nanotubes, and uses for encapsulated nanotubes. Carbon nanotubes are encapsulated by self assembly of Uses of the present invention include making arrays as a basis for synthesis of carbon fibers.

28 Claims, 9 Drawing Sheets

ENCAPSULATION OF NANOTUBES VIA SELF-ASSEMBLED NANOSTRUCTURES

CROSS REFERENCES TO RELATED APPLICATIONS

This application claims priority from U.S. Provisional Application Ser. No. 60/373,827 filed Apr. 18, 2002 the contents of which are incorporated herein by reference in their entirety.

GOVERNMENT INTERESTS

The United States Government may have certain rights to this invention pursuant to work funded thereby at Northwestern University under grants from the National Science Foundation Grant No. EEC-0118025 W Main N602.

BACKGROUND OF THE INVENTION

Fullerenes are closed-cage molecules composed entirely of $sp^2$ hybridized carbons, arranged in hexagons and pentagons. Fullerenes (e.g. $C_{60}$) were first identified as closed spheroidal cages produced by condensation from vaporized carbon.

Fullerene tubes are produced in carbon deposits on the cathode in carbon arc methods of producing spheroidal fullerenes from vaporized carbon. Such tubes are referred to herein as carbon nanotubes. Many of the carbon nanotubes made by these processes are multi-wall nanotubes i.e. the carbon nanotubes resemble concentric cylinders. Carbon nanotubes of seven walls have been described in the prior art.

Single-wall carbon nanotubes (SWNT) have been made in a DC arc discharge apparatus of the type used in fullerene production by simultaneously evaporating carbon and a small percentage of VIII B transition metal from the anode of the arc discharge apparatus. It is also known that the use of mixtures of such transition metals can significantly enhance the yield of single-wall carbon nanotubes in the arc discharge apparatus. While the arc discharge process can produce single-wall nanotubes, the yield of nanotubes is low and the tubes exhibit significant variations in structure and size between individual tubes in the mixture. Individual carbon nanotubes are difficult to separate from the other reaction products and purify.

A method of producing single-wall nanotubes is described in U.S. Pat. No. 6,183,714 entitled "Ropes of Single-Walled Carbon Nanotubes" incorporated herein by reference in its entirety. This method uses, inter alia, laser vaporization of a graphite substrate doped with transition metal atoms, preferably nickel, cobalt, or a mixture thereof, to produce single-wall carbon nanotubes in yields of at least 50% of the condensed carbon. The single-wall nanotubes produced by this method tend to be formed in clusters, termed "ropes," of 10 to 1000 single-wall carbon nanotubes in parallel alignment, held together by van deer Waals forces in a closely packed triangular lattice. Nanotubes produced by this method vary in structure, although one structure tends to predominate.

A method of producing carbon fibers from single-wall carbon nanotubes is described in PCT Patent Application No. PCT/US98/04513, incorporated herein by reference in its entirety. The carbon fibers are produced using molecules in a substantially two-dimensional array made up of single-walled nanotubes aggregated (e.g., by van deer Waals forces) in substantially parallel orientation to form a monolayer extending in directions substantially perpendicular to the orientation of the individual nanotubes. In this process the seed array tubes are opened at the top (free) end and a catalyst cluster is deposited at this free end. A gaseous carbon source is then provided to grow the nanotube assembly into a fiber. In various processes involving metal cluster catalysis, it is important to provide the proper number of metal atoms to give the optimum size cluster for single wall nanotube formation.

Since the discovery of single wall carbon nanotubes (SWNTs) in 1993 researchers have been searching for ways to manipulate them chemically. While there have been many reports and review articles on the production and physical properties of carbon nanotubes, reports on chemical manipulation of nanotubes have been slow to emerge. There have been reports of functionalizing nanotube ends with carboxylic groups and then further manipulation to tether them to gold particles via thiol linkages Haddon and co-workers have reported solvating SWNTs by adding octadecylamine groups on the ends of the tubes and then adding dichlorocarbenes to the nanotube side wall, albeit in relatively low quantities. While theoretical results have suggested that functionalization of the nanotube side-wall is possible, chemical modification of nanotube surfaces via covalent and ionic interactions to improve their solubility modify the chemical integrity of the carbon nanotube.

PCT Publication No. WO 00/17101, which is hereby incorporated by reference in its entirety describes the chemical derivization of single-wall carbon nanotubes to facilitate solvation and uses of the derivatized nanotubes. Chemical modification of the carbon nanotube structure would adversely affect both the mechanical and electrical properties of the carbon nanotubes. Another system reported in the literature utilizes a polymer wrapping technique.

SUMMARY OF THE INVENTION

The present invention is directed to carbon nanotubes or rod-like structures encapsulated in self-assembled nanostructures. The present invention is more particularly directed to encapsulated carbon nanotubes, methods of encapsulating carbon nanotubes, methods of making encapsulated carbon nanotubes and for uses of the encapsulated carbon nanotubes. While not wishing to be bound by theory, the system proposed herein increases the solubility of nanotubes by reversibly and non-destructively encapsulating the nanotubes in an insulating layer of self-assembled amphiphiles.

One embodiment of the present invention is are compositions which includes carbon nanotubes and amphiphiles capable of forming self assembled nanofibers. The amphiphiles are themselves characterized in that they may self assembly into gels made of nanofibers composed of the amphiphiles. In the present embodiment these amphiphiles encapsulating or coat all or a portion of the carbon nanotubes. The composition is preferably a dispersion of the carbon nanotubes and the amphiphiles in a liquid.

Another embodiment of the present invention is are compositions made by combining carbon nanotubes and amphiphiles. The amphiphiles are themselves characterized in that they can self assembly into gels made of nanofibers composed of the amphiphiles. The composition made by the combination is preferably in the form of a dispersion of the carbon nanotubes and the amphiphiles in a liquid.

Another embodiment of the present invention is are compositions including carbon nanotubes and a self assembled amphiphile gel. The gel is formed from self assembled amphiphiles encapsulating the carbon nanotubes.

Another embodiment of the present invention is a method of encapsulating or coating carbon nanotubes. The method includes combining carbon nanotubes with amphiphiles which themselves are capable of forming a self-assembled nanofiber gels. Preferably the combination of the carbon nanotubes and the amphiphiles forms a dispersion of the carbon nanotubes in a liquid. The combined carbon nanofibers and amphiphiles may be made into a gel by initiating self assembly of the amphiphiles to form self assembled nanofibers encapsulating the carbon nanotubes. The method may further includes the act of initiating self assembly of said amphiphiles.

Another embodiment of the present invention is a method of manufacturing a device which incorporates amphiphile coated carbon nanotubes. The method includes coating carbon nanotubes with amphiphiles capable of forming self assembled nanofibers, the amphiphiles encapsulating or coating the carbon nanotubes. The amphiphile coated carbon nanotubes are then incorporated into a device.

In a preferred embodiment of the present invention amphiphiles incorporating motifs of the type described herein are utilized to encapsulate or at least partially surround carbon nanotubes. In an even more preferred embodiment the self-assembled amphiphiles are peptide amphiphiles.

In preferred embodiments consideration may be given to including isoprene or thiol residues (e.g. cysteine) as part of the amphiphile to ensure covalent linkage among the self-assembled amphiphiles.

Another embodiment of the present invention provides a process for preparing a suspension or solution of single wall carbon nanotubes in various solvents from which individual single wall carbon nanotubes may be isolated. The process comprises providing a mass of single wall carbon nanotubes that will generally include bundles of fibers held in close association by van deer Waals forces, encapsulating the carbon nanotubes with amphiphiles that are capable of self assembly into nanofibers themselves to produce a dispersion of individual carbon nanotubes. The coated and dispersed individual carbon nanotubes are then recovered from the solution or suspension.

BRIEF DESCRIPTION OF THE DRAWINGS

In part, other aspects, features, benefits and advantages of the embodiments of the present invention will be apparent with regard to the following description, appended claims and accompanying drawings where:

DETAILED DESCRIPTION OF PREFERRED EMBODIMENTS

Figure 1:
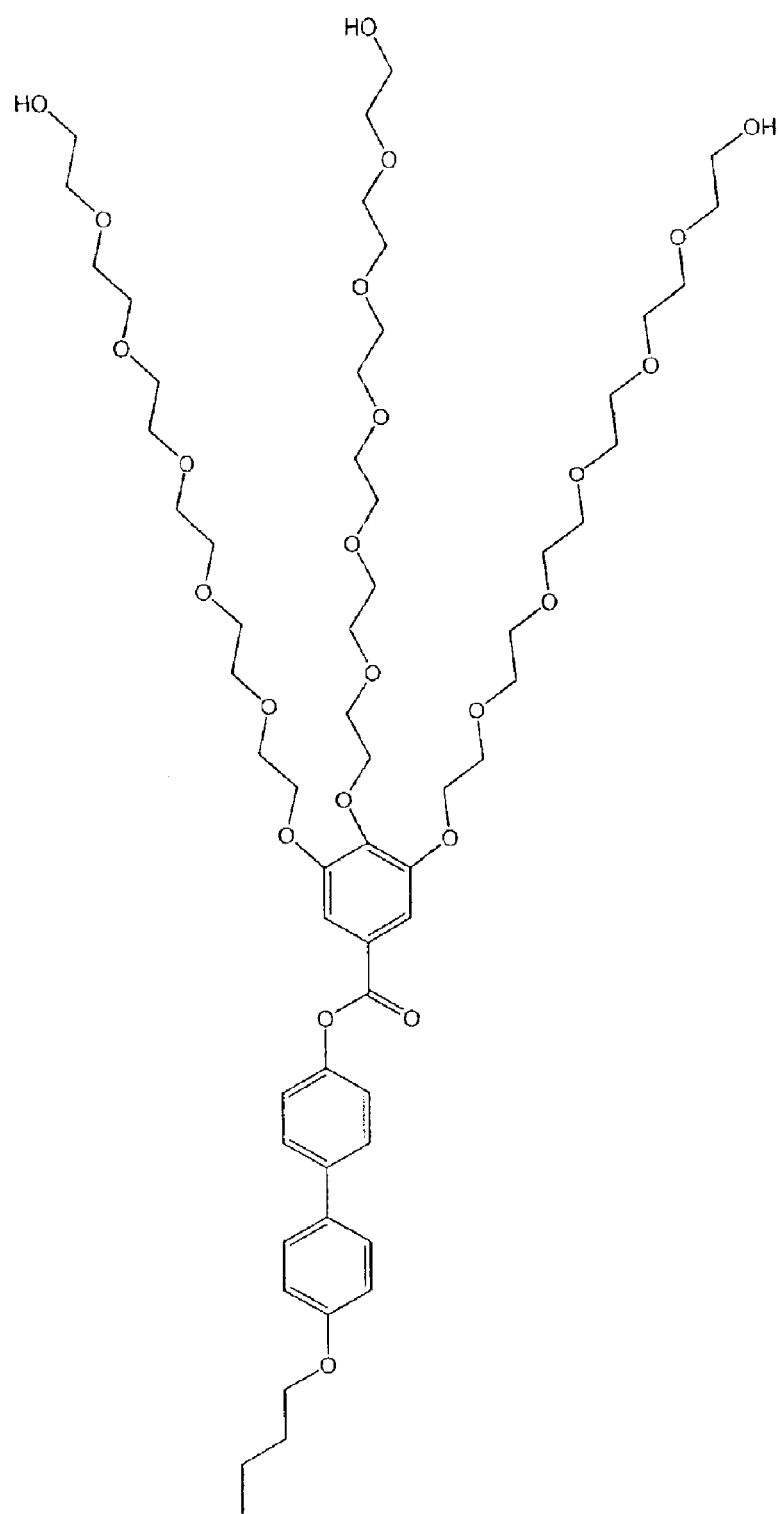
FIG. 1 illustrates an example of an amphiphile expected to be useful in encapsulating carbon nanotubes in accordance with the present invention.

Before the present compositions and methods are described, it is to be understood that this invention is not limited to the particular molecules, compositions, methodologies or protocols described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "amphiphile" is a reference to one or more amphiphiles and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference. Nothing herein is to be construed as an admission that the invention is not entitled to antedate such disclosure by virtue of prior invention.

Carbon has the propensity to self assemble from a high temperature vapor to form perfect spheroidal closed cages (of which $C_{60}$ is prototypical), but also (with the aid of a transition metal catalyst) to assemble into perfect single-wall cylindrical tubes. These cylindrical tubes may be open or may be sealed perfectly at both ends with a semi-fullerene dome Single-wall carbon nanotubes are much more likely to be free of defects than multi-wall carbon nanotubes. Defects in single-wall carbon nanotubes are less likely than defects in multi-walled carbon nanotubes because the latter have neighboring walls that provide for easily-formed defect sites via bridges between unsaturated carbon valances in adjacent tube walls. Since single-wall carbon nanotubes have fewer defects, they are stronger, more conductive, and therefore more useful than multi-wall carbon nanotubes of similar diameter.

Carbon nanotubes, and in particular the single-wall carbon nanotubes, are useful for making electrical connectors in micro devices such as integrated circuits or in semiconductor chips used in computers because of the electrical conductivity and small size of the carbon nanotube. The carbon nanotubes are useful as antennas at optical frequencies, and as probes for scanning probe microscopy such as are used in scanning tunneling microscopes (STM) and atomic force microscopes (AFM). The carbon nanotubes may be used in place of or in conjunction with carbon black in tires for motor vehicles. The carbon nanotubes are also useful as supports for catalysts used in industrial and chemical processes such as hydrogenation, reforming and cracking catalysts.

Ropes of single-wall carbon nanotubes are electrically conductive with a relatively low resistance. Ropes may be useful in any application where an electrical conductor is needed, for example as an additive in electrically conductive paints or in polymer coatings or as the probing tip of an STM.

In defining carbon nanotubes, it is helpful to use a recognized system of nomenclature. The single-wall tubular fullerenes are distinguished from each other by double index (n,m) where n and in are integers that describe how to cut a single strip of hexagonal "chicken-wire" graphite so that it makes the tube perfectly when it is wrapped onto the surface of a cylinder and the edges are sealed together. When the two indices are the same, m=n, the resultant tube is said to be of the "arm-chair" (or n,n) type, since when the tube is cut perpendicular to the tube axis, only the sides of the hexagons are exposed and their pattern around the periphery of the tube edge resembles the arm and seat of an arm chair repeated n times. Arm-chair tubes are a preferred form of single-wall carbon nanotubes since they are metallic, and have extremely high electrical and thermal conductivity. In addition, all single-wall nanotubes have extremely high tensile strength.

Carbon nanotubes may have diameters ranging from about 0.6 nanometers (nm) for a single-wall carbon nanotube up to about 3 nm, 5 nm, 10 nm, 30 nm, 60 nm or 100 nm for single-wall or multi-wall carbon nanotubes. The carbon nanotubes may generally range in length from 50 nm up to 1 millimeter (mm), 1 centimeter (cm), 3 cm, 5 cm, or greater.

As will be described further, one or more transition metals of Group VIB chromium (Cr), molybdenum (Mo), tungsten (W) or Group VIII B transition metals, e.g., iron (Fe), cobalt (Co), nickel (Ni), ruthenium (Ru), rhodium (Rh), palladium (Pd), osmium (Os), iridium. (Ir) and platinum (Pt) catalyze the growth of a carbon nanotube and/or ropes when contacted with a carbon bearing gas such carbon monoxide and hydrocarbons, including aromatic hydrocarbons, e.g., benzene, toluene, xylene, cumene, ethylbenzene, naphthalene, phenanthrene, anthracene or mixtures thereof, non-aromic hydrocarbons, e.g., methane, ethane, propane, ethylene, propylene, acetylene or mixtures thereof; and oxygen-containing hydrocarbons, e.g., formaldehyde, acetaldehyde, acetone, methanol, ethanol or mixtures thereof mixtures of one or more Group VIB or VIII B transition metals also selectively produce single-wall carbon nanotubes and ropes of single-wall carbon nanotubes in higher yields. The mechanism by which the growth in the carbon nanotube and/or rope is accomplished is not completely understood. However, it appears that the presence of the transition metals on the end of the carbon nanotube facilitates the addition of carbon from the carbon vapor to the solid structure that forms the carbon nanotube.

The carbon nanotube that is formed is not always a single-wall carbon nanotube; it may be a multi-wall carbon nanotube having two, five, ten or any greater number of walls (concentric carbon nanotubes). Preferably, though, the carbon nanotube is a single-wall carbon nanotube, and this invention provides a way of selectively producing single-wall carbon nanotubes in greater and sometimes far greater abundance than multi-wall carbon nanotubes.

The term "alkyl" as employed herein includes both straight and branched chain radicals, for example methyl, ethyl, propyl, isopropyl, butyl, t-butyl, isobutyl, pentyl, hexyl, isohexyl, heptyl, 4,4-dimethylpentyl, octyl, 2,2,4-trimethylpentyl, nonyl, decyl, undecyl, dodecyl, the various branched chain isomers thereof. The chain may be linear or cyclic, saturated or unsaturated, containing, for example, double and triple bonds. The alkyl chain may be interrupted or substituted with, for example, one or more halogen, oxygen, hydroxy, silyl, amino, or other acceptable substituents.

The term "acyl" as used herein refers to carbonyl groups of the formula —COR wherein R may be any suitable substituent such as, for example, alkyl, aryl, aralkyl, halogen; substituted or unsubstituted thiol; unsubstituted or substituted amino, unsubstituted or substituted oxygen, hydroxy, or hydrogen.

The term "aryl" as employed herein refers to monocyclic, bicyclic or tricyclic aromatic groups containing from 6 to 14 carbons in the ring portion, such as phenyl, naphthyl, substituted phenyl, or substituted naphthyl, wherein the substituent on either the phenyl or naphthyl may be for example C1–4 alkyl, halogen, C1–4 alkoxy, hydroxy or nitro.

The term "aralkyl" as used herein refers to alkyl groups as discussed above having an aryl substituent, such as benzyl, p-nitrobenzyl, phenylethyl, diphenylmethyl, and triphenylmethyl.

The term "aromatic or non-aromatic ring" as used herein includes 5–8 membered aromatic and non-aromatic rings uninterrupted or interrupted with one or more heteroatom, for example O, S, SO, SO2, and N, or the ring may be unsubstituted or substituted with, for example, halogen, alkyl, acyl, hydroxy, aryl, and amino, said heteroatom and substituent may also be substituted with, for example, alkyl, acyl, aryl, or aralkyl.

The term "linear or cyclic" when used herein includes, for example, a linear chain which may optionally be interrupted by an aromatic or non-aromatic ring. Cyclic chain includes, for example, an aromatic or non-aromatic ring that may be connected to, for example, a carbon chain that either precedes or follows the ring.

The term "substituted amino" as used herein refers to an amino which may be substituted with one or more substituent, for example, alkyl, acyl, aryl, aralkyl, hydroxy, and hydrogen.

The term "substituted thiol" as used herein refers to a thiol that may be substituted with one or more substituent, for example, alkyl, acyl, aryl, aralkyl, hydroxy, and hydrogen.

In addition to the above described encapsulation, the SWNT molecules of the present invention can be modified endohedrally, i.e., by including one or more other atoms or molecules inside the structure, as is known in the endohedral fullerene art, as well as external derivation. To produce endohedral tubular carbon molecules, the internal species metal atom) can either be introduced during the SWNT formation process or added after preparation of the nanotubes.

Endohedrally loaded tubular carbon molecules can then be separated from empty tubes and any remaining loading materials by taking advantage of the new properties introduced into the loaded tubular molecules, for example, where the metal atom imparts magnetic or paramagnetic properties to the tubes, or the bucky ball imparts extra mass to the tubes. Separation and purification methods based on these properties and others will be readily apparent to those skilled in the art.

Carbon nanotubes have unique mechanical and electronic properties, but lack processability due to their limited solubility in common solvents. Nanotubes are not easily solvated and tend to pack into large bundles or "ropes." While not wishing to be bound by theory, this appears to be, in part, due to $\pi$—$\pi$ stacking interactions between the $Sp^2$ hybridized carbons of the nanotube. This wrapping technique may not serve as a good electrically insulating layer for future applications. The system we propose increases the solubility of nanotubes by self assembly to reversibly and non-destructively encapsulate carbon nanotubes by an insulating layer of amphiphiles.

As used herein a single wall carbon nanotube refers to a hollow carbon fiber having a wall consisting essentially of a single layer of carbon atoms. Single wall carbon nanotubes can be made by the processes disclosed in Iijima et al., Nature, Vol. 363, p. 603 (1993); D. S. Bethune et al., Nature 63 (1993) 060, U.S. Pat. No. 5,424,054, R. Smalley et al, Chem. Phys. Letters, Vol. 243 (1995) 49–54 and Science Vol. 273 (1996) 483–487.

Prior to forming the acid derivatized nanotube, it may be necessary to cut the nanotubes and optionally purify them. Highly tangled ropes of nanotubes currently available or produced by the methods referenced above can be cut into short lengths of open tubes of about 10 to 300 nm in length. The cut tubes can then be suspended, sorted, and manipulated as individual macromolecules (see Liu et al., Science, Vol. 280, 1253–1256, 1998).

A specific structural feature of amphiphiles of the present invention is their overall conical shape from the hydrophobic or lyophobic tail to the hydrophilic or lyophillic head group. Generally the hydrophilic block has a larger cross-section than that of the hydrophobic segment. While not wishing to be bound by theory, this shape facilitates the self assembly formation of spherical, cylindrical, or ribbon like structures. In these micelles in an liquid environment the hydrophilic or lyophilic portions of the molecule are exposed to the exterior or liquid environment and the hydrophobic or lyophobic portions of the molecule are hidden from the liquid on the inside the micelle structure. Reactive functional groups may be present in the individual molecules which permit them to react with adjacent molecule and capture a self assembled structure. Examples useful in the present invention include but are not limited to, cysteine amino acids in an amphiphile which may be reacted with one another to form disulfide bonds between adjacent amphiphiles; isoprene groups in amphiphiles which may be reacted with one another to form carbon-carbon bonds between adjacent amphiphiles. These cross linkable amphiphiles may be used to prevent removal or disassembly of amphiphiles encapsulating a carbon nanotube. Unless there is an interaction between neighboring amphiphiles any self-assembled coating or encapsulation will un-assemble in the absence of water and limit non-aqueous applications. Cross linked or interacting amphiphiles may be used to form stable structures of amphiphiles self assembled on the carbon nanotubes out of aqueous solution.

The concentration, milligrams amphiphile/ml solution, that may be used in the present invention will depend upon the properties of the amphiphile including its molecular size, molecular weight, packing volume, solubility, and the number and surface area of carbon nanotubes to be encapsulated. Preferably the concentration of the amphiphile in solution is in the range from about 0.1 to about 10 mg/ml. An excess of amphiphile may be present in the solution or one normally skilled in the art could determine the required concentration for the amphiphile outside of this range without undue experimentation by combining amphiphiles and carbon nanotubes and examining the solutions for the formation of a dispersion. Where a dispersion does not form or encapsulation does not occur, additional amphiphile could be added to the solution.

The packing of the rigid rods into a cylindrical or a spherical core is highly problematic because the packing would create free volume and for amphiphiles with aromatic groups would prevent aromatic π—π stacking interactions between amphiphiles. It was previously demonstrated that such systems find a structural compromise by creating hollow spheres. Therefore the amphiphiles described in the present invention may self assemble on the hydrophobic surface of single walled carbon nanotubes and form hollow cylindrical micelles.

Figure 2:
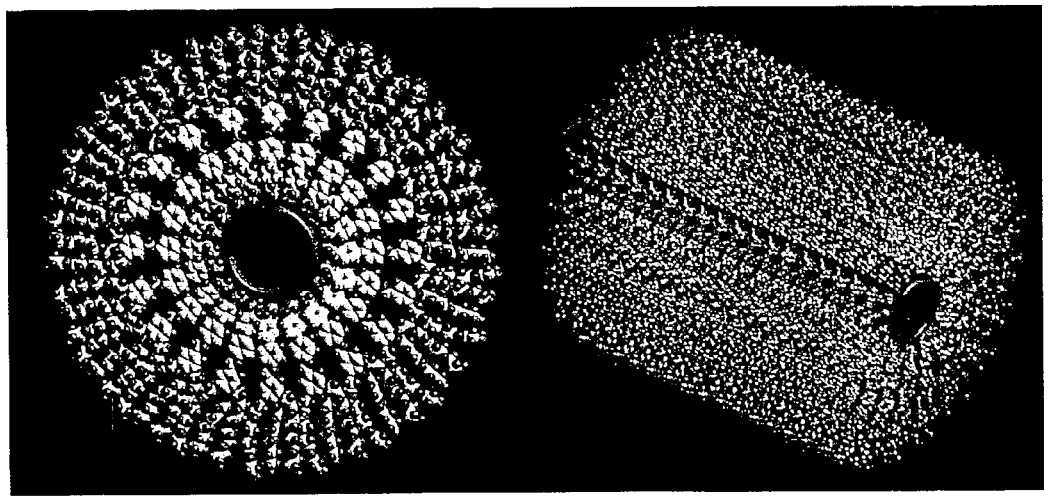
FIG. 2 illustrates the predicted molecular structure of a self-assembled amphiphile around a carbon nanotube.
Figure 7:
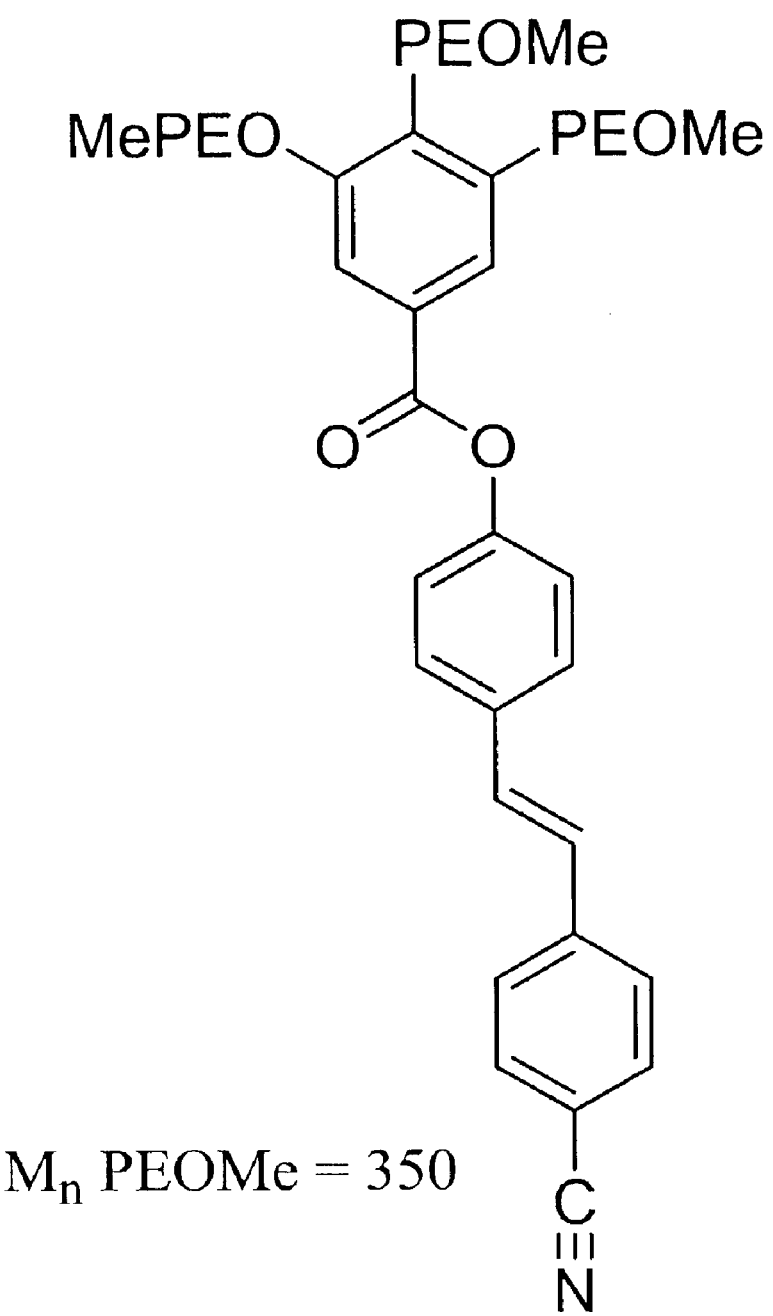
FIG. 7 illustrates yet another example of an Amphiphile useful in the present invention.

A novel class of molecules for encapsulating or coating the carbon nanotubes, introduced for the first time herein is illustrated in FIG. 1 and FIG. 7. The molecule illustrated in FIG. 1 has a structural motif of a short hydrophobic segment consisting of an alkyl group, a rigid biphenyl segment (also hydrophobic) and three hydrophilic hexaethylene glycol tails attached to a trihydroxybenzene moiety. A related molecule, FIG. 7 illustrates PPV rather than biphenyl and a cyano group, as well a MePEO tails. This class of molecules would appear to have particularly useful application in encapsulating nanotubes, particularly carbon nanotubes. Preliminary molecular simulation studies of a molecule of the type in FIG. 1, using Cerius 2 indicate cylindrical packing of the molecules of the type shown in FIG. 1 around a carbon nanotube is thermodynamically more stable than hollow micellar packing in an aqueous environment. FIG. 2 illustrates the predicted molecular structure around a carbon nanotube in such an amphiphile. By using the carbon nanotube, center core structure in FIG. 2, as a template for self assembly, π—π stacking interactions of the amphiphiles are satisfied without an energetic sacrifice to the amphiphilic packing of the molecule.

For the molecules of FIG. 1 or FIG. 7, various values of n for $(CH_2CH_2O)_n$ may also lead to amphiphiles that self assemble and encapsulate carbon nanotubes. Illustrated but not limited to the molecule in FIG. (I), show below by the general structure of Formula (I), the value of n for $R^2$, $R^3$, $R^4$ may differ and self-assembled structures may still be able to form; eliminating $R^3$ but increasing the length of $R^2$ and $R^4$ (more $(CH_2CH_2O)$ monomers) may also result in amphiphiles of comparable water solubility and amphiphilic moment. Similar changes may be made for the class of molecule illustrated FIG. 7.

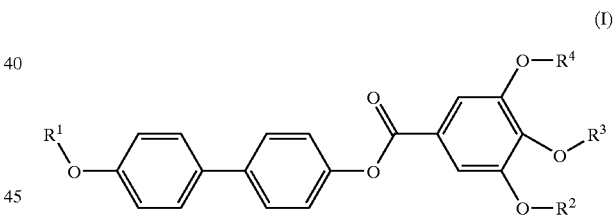

(I)

Encapsulation of carbon nanotubes by amphiphilic molecules should be energetically favorable. The wrapping of single-walled carbon nanotubes with linear polymers has been reported and it has been proposed that the elimination of the unfavorable interface between water and the hydrophobic nanotubes drives the association. Calculations indicate that the free energy of a single-walled carbon nanotube and a strand of polyvinyl pyrrolidone will decrease by 136 kJ/mol per nanometer of overlap upon association. Likewise, encapsulation of single-walled carbon nanotubes by amphiphilic molecules should also be energetically favorable due to the elimination of nanotube-water interfaces.

Experimental evidence suggests that single walled carbon nanotubes in the presence of the amphiphilic molecules increases their solubility. Upon addition of nanotubes to an aqueous solution of amphiphile and sonication for two hours, the sample changes from a black colloidal suspension to a dark gray homogeneous solution or dispersion of the amphiphile coated carbon nanotubes. NMR may be used to show evidence of the aggregation of amphiphiles around the carbon nanotube. The NMR signals of the amphiphile in $D_2O$ are significantly broadened by the addition of nanotubes, indicating aggregation of the amphiphiles due to the lack of rotational freedom of the normally unassembled amphiphiles in a solution; self assembly of the amphiphiles on the carbon nanotube results in ordering of the amphiphiles and the broaded NMR signal. Coated and solubilized single walled carbon nanotubes will not flocculate in water resulting in a sediment of carbon nanotubes in the water. Rather, coated and solublized carbon nanotube completely or partially encapsulated by the self assembling amphiphiles of the present invention will remain dispersed and suspended as a clear solution for indefinite periods of time.

In a preferred embodiment of this invention, the amphiphile may include moieties which allow the amphiphiles to be cross-linked with each other to capture the self-assembled macromolecular structure. Cysteine amino acid residues in the structure of the amphiphile may be used to cross-link self assembled amphiphile structure on the nanotube. An example of a compound that is particularly useful in the practice of this invention is shown in FIG. 3.

Figure 3:
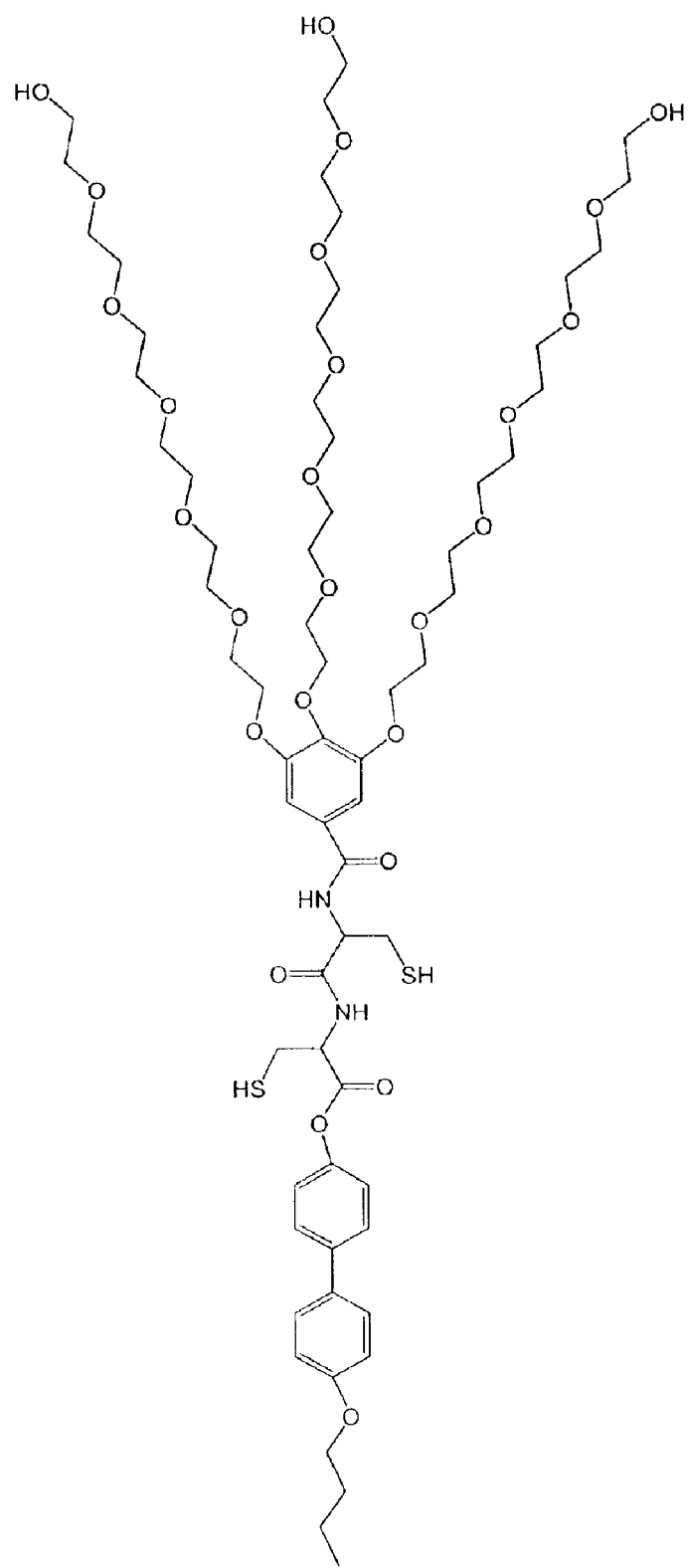
FIG. 3 illustrates another example of a amphiphile useful in accordance with the present invention.

By placing two or three cysteine residues between the biphenyl and benzoic acid portion of the molecule shown in FIG. 3, the amphiphilicity of the molecule is retained while also introducing the possibility of dithiol bond formation by oxidizing the cysteine residues on adjacent amphiphiles self assembled on the nanotube surface. If this oxidation is done in a self assembled state, it is expect to covalently capture molecular coating of the nanotube. An advantage to the dithiol covalent capture is that it is reversible. The introduction of a reducing agent to the system (i.e. dithiothreitol (DTT)) will reduce the dithiol bonds, allowing us to strip the coating from the nanotube. Another method of cross-linking available to us would be to use oligobutadiene as the greasy tail instead of the alkyl chain. The oligobutadiene chains can be cross-linked thermally for the covalent capture of self assembled amphiphiles on the nanotube surface.

Figure 4:
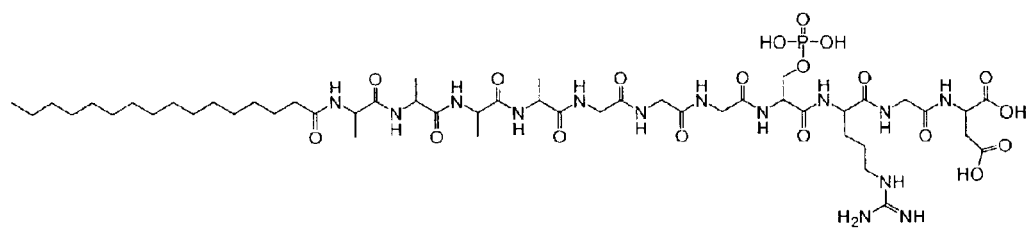
FIG. 4 illustrates the general structure of a peptide amphiphile that self assembles and may be used to encapsulate carbon nanotubes in accordance with the present invention.

Another class of amphiphile that would be expect to solubilize and self assemble about carbon nanotubes are peptide amphiphiles and salts of these amphiphiles. These peptide amphiphiles, see Stupp et. al PNAS, (2002), vol 99, pp 5133–5138 the contents of which are included herein by reference in its entirety, may themselves be self assembled into gels comprised of nanofibers of the amphiphiles. Cylindrical micelles may self assembled from peptide-amphiphiles in water. Each amphiphile consists of a hydrophilic peptide coupled to a hydrophobic alkyl tail as shown in FIG. 4. The assembled cylindrical micelles, peptide amphiphile fibers, can be reversibility cross-linked for enhanced structural integrity. At neutral pH, the peptide amphiphile molecules are water-soluble. However, at pH less than four, the molecules become water insoluble, spontaneously self-assembling into cylindrical micelles.

Shortening or altering the alkyl tail of these peptide amphiphile should make it possible to induce the formation of a cylindrical micelle around a single-walled carbon nanotube in a fashion similar to that proposed with molecule of FIG. 2. The number of carbon atoms in the hydrophobic segment of these amphiphiles may range from zero up to about 16 carbon atoms. After encapsulation, cross-linking the peptide amphiphile would allow for the formation a robust and permanent sheath. Although a peptide amphiphile fiber not cross-linked will only be stable at pH less than about four we anticipate useful applications for these peptide-amphiphiles. A cross-linked peptide amphiphile fiber would be stable even at neutral pH. Self-assembly of the peptide-amphiphile molecule could represent a second path toward molecular encapsulation of carbon nanotubes.

Another molecule we would expect to be particularly useful in the present invention to solublize carbon nanotubes is dendron rod coil (DRC). These DRC's self assemble to form well-defines bimolecular ribbon or nanofiber which make up a gel of these molecules. Such molecules and their synthesis are described by Stupp et al in Marcomolecules, (2000), vol 33, pp 3550–3556; Stupp et al in Science (1999), vol 283, pp 523–526; and Stupp et al J. Am. Chem. Soc. (2001), vol 123, pp 4150 the contents of which are incorporated herein by reference in their entirety. The general triblock structure is D-R-C where D is a dendritic block, R is a rigid oligomer or polymer, and block C is a flexible oligomer or polymer; the bonds connecting the D, R, and C blocks are covalent bonds. Isoprene groups may be present in the DRC molecule and may be polymerized by heating following self assembly to provide capture of the self assembled structure. Like the cysteine groups, the isoprene groups permit covalent capture of the self assembled amphiphiles on the surface of the carbon nanotube enhancing the stability of the structure. Other polymerizable groups such as but not limited to acetylenic, and diacetylenic moieties may also be included in the amphiphiles of the present invention as would be known to those skilled in the art.

Figure 5:
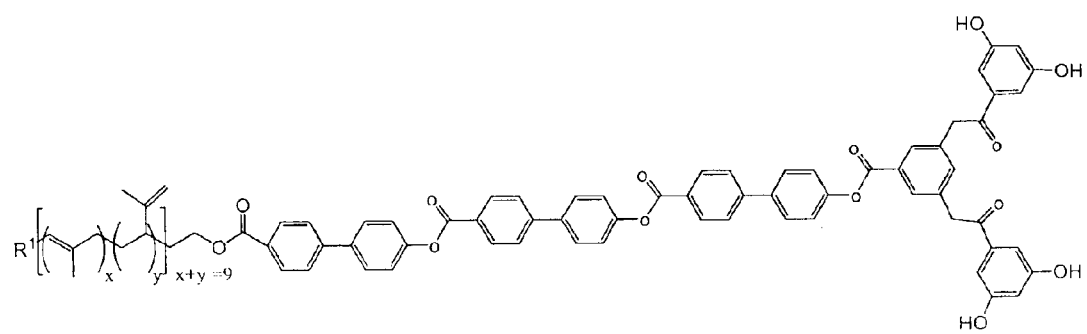
FIG. 5 illustrates another embodiment of a peptide-amphiphile useful in accordance with the present invention.
Figure 6A:
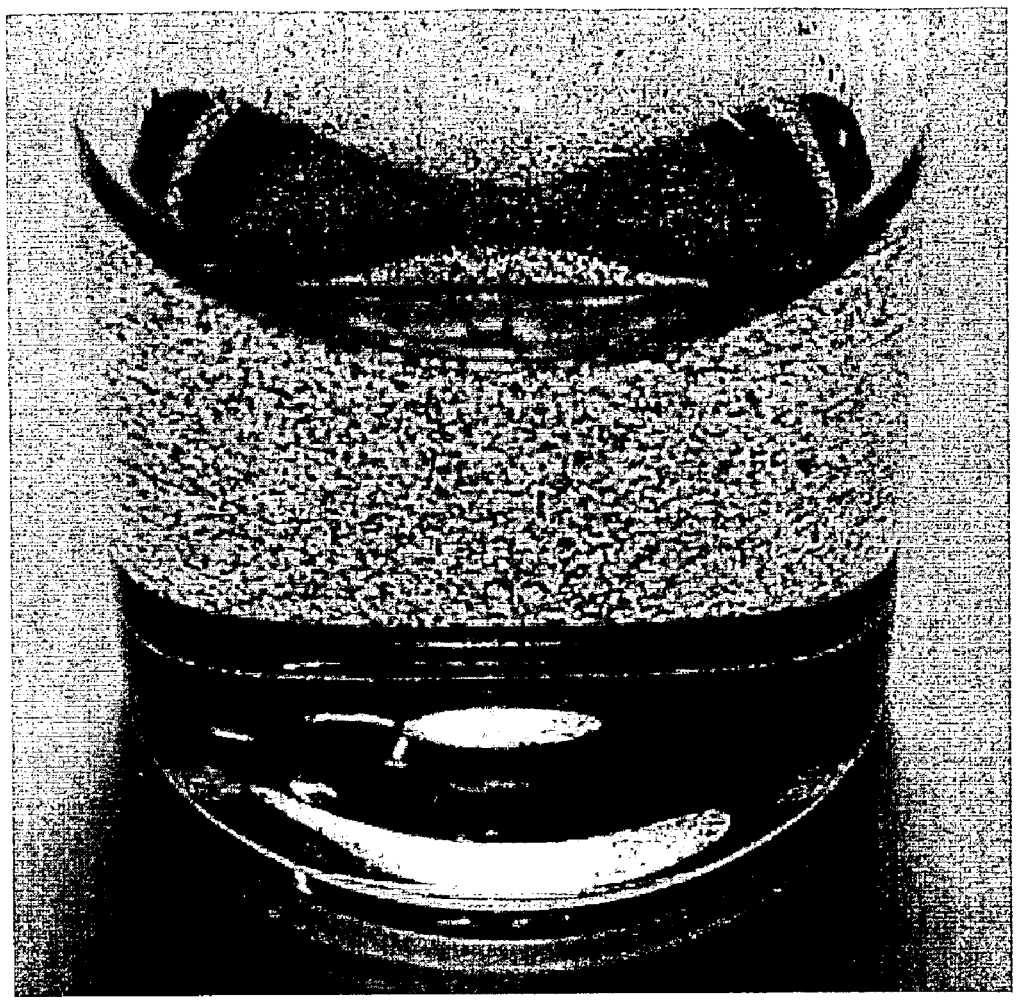
FIG. 6 is a photograph of single wall carbon nanotubes in: (a) flocculated water; (b) dispersed in water with the amphiphile of FIG. 7 of the present invention; and (c) dispersed in water with the amphiphile shown in FIG. 4 of the present invention capable of forming self assembled nanofibers.
Figure 6B:
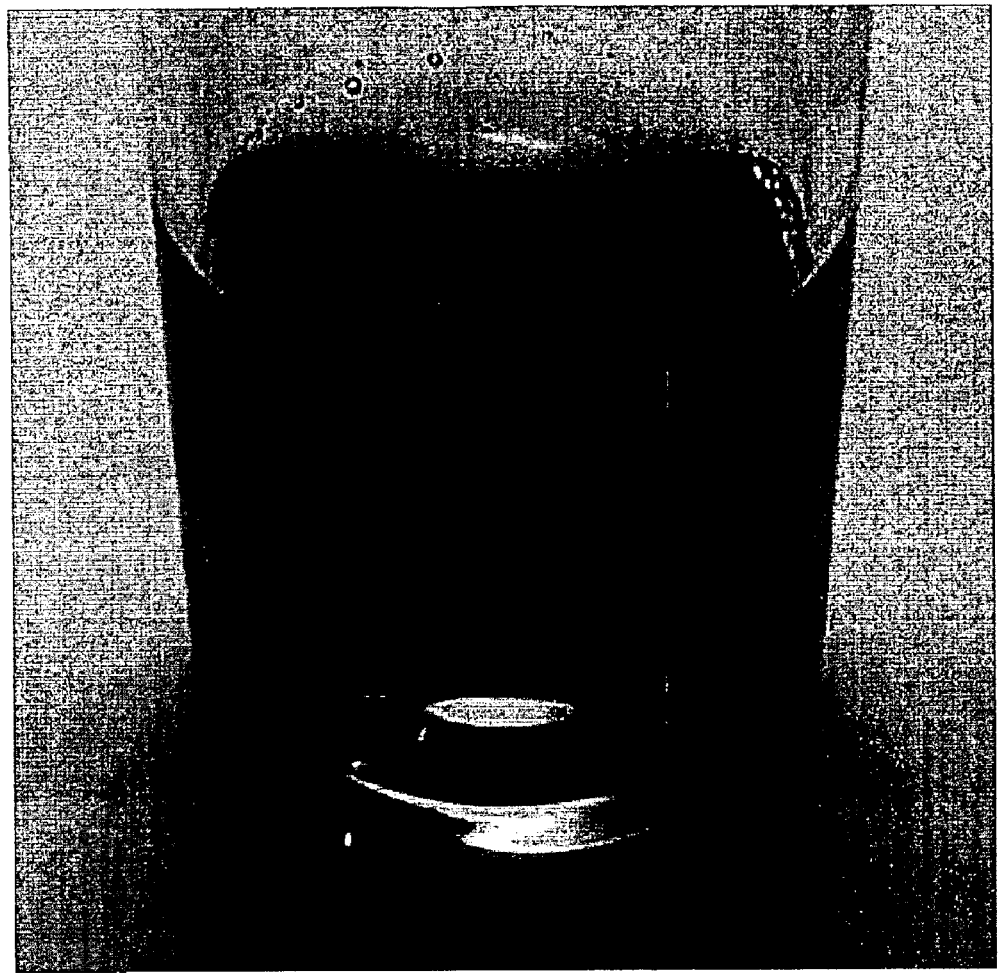
Figure 6C:

Addition of a DRC, for example the molecule as illustrated in FIG. 5, was also found to increase solubility of SWNTs in a solution 1,2-dicloroethane. In a typical procedure 0.2 mg of SWNTs were first sonicated in 2 g of 1,2-dicloroetane (DCE) and 20 mg of DRC was added to the suspension. The mixture was sonicated for 5 minutes and heated for 1 minute until physical gel formed. The obtained black gel was transparent to visible light and remained stable for unlimited period of time.

Single wall carbon nanotubes (0.2 mg) were dispersed in styrene (2 g) and the suspension was sonicated for 5 min at room temperature. Dendron rodcoil molecules as shown in FIG. 5 (15 mg) were then added and the mixture was sonicated for additional 5 minutes and heated until all solid material (SWNTs and DRC) was no longer visible. The resultant black solution was cooled to room temperature and a physical gel formed within the following 30 min. The gel was aged for additional 2 hours and the vial containing the gel was placed into oven at 100 C. The sample was polymerized for 24 h. The obtained hard material remained translucent and macrophase separation did not take place upon polymerization.

The synthesis of the peptide amphiphile is done via solid phase peptide chemistry that is automated by a Applied Biosystems peptide synthesizer. The final coupling of alkyl chain is also done on the solid phase, making for a facile and high yielding synthesis.

Water/nanotube/amphiphile solutions were prepared by the addition of purified Hipco single walled carbon nanotubes to a solution of deionized water and amphiphile at a mass ratio of 50:1–1000:1 amphiphile:carbon nanotubes. Concentrations of the nanotube solutions range from 1 to 50 mg per ml. The solutions are then sonicated at low power for one hour. The resulting homogeneous dark gray solutions are stable for weeks and do not phase separate.

An encapsulating layer around a carbon nanotube would improve nanotube solubility in solvents such as water, allowing for enhanced processability without chemically modifying the nanotube. Unlike pure carbon nanotubes, encapsulated nanotubes could be purified by chromatographic techniques to remove impurities and selectively isolate them by length. The encapsulation of carbon nanotubes in peptide amphiphile fibers would allow for the application of carbon nanotubes in biological systems where conductive biologically compatible materials are needed.

Carbon nanotubes may also serve as the interconnects of integrated circuits because they are small, can be highly conductive, and do not degrade from electromigration. With current technology, silicon based integrated circuits consist of up to seven layers of lithographically defined metal connections which must be separated by an insulator. The proposed encapsulated carbon nanotubes could have many applications in this field. Carbon nanotubes, and preferably single wall carbon nanotubes, encapsulated by the amphiphiles of the present invention may be isolated as individual coated fibers and positioned on a substrate as part of an electronic circuit or device. The coated carbon nanotube may be electrically connected to the circuit by other conductive or semiconducting materials. In some ways, the system described is similar to a metal wire coated in plastic. The encapsulated nanotube could be used as a coated wire for interconnects in molecular circuitry as well as for field effect transistors where the self assembled insulating coat serves as the transistor dielectric. In an integrated circuit, a gate dielectric must be carefully grown to an exact dimension, which is both difficult and expensive. With molecular encapsulation of carbon nanotubes, this gate dielectric could be simply fabricated via self-assembly in a "bottom up" fashion.

The self assembled jacket of amphiphilic molecules, once cross-linked, should remain stable in solution and have the capability of undergoing additional chemistry and functionalization without diminishing the electrical properties of the carbon nanotube. This is particularly relevant to the field of sensing. The hydroxyl terminated jacket can be coupled with virtually anything, including specific binders. A binding event on the surface of the jacketed carbon nanotube could induce a change in its conductivity.

Other chemical modification to the hydrophilic portion of the amphiphile could provide means of surface interactions. For example, an additional thiol group on the periphery of the amphiphilic molecule should make it possible to bind these structures to a gold surface. The jacket could be synthesized with a larger hydrophobic region which could serve as an insulating layer between the gold and the nanotube. The stabilization of carbon nanotubes by DRC in styrene could potentially serve as a means to create hybrid polymeric materials strengthened by carbon nanotubes.

While this invention has been described with an emphasis upon preferred embodiments, it will be obvious to those of ordinary skill in the art that variations of the preferred compounds and methods may be used and that it is intended that the invention may be practiced otherwise than as specifically described herein.

All of the references cited herein as well as those referenced in the priority document, including patents, patent applications, literature publications, and the like, are hereby incorporated in their entireties by reference to the extent they support the present application.

What is claimed:

1. A composition comprising:
a carbon nanotube; and
amphiphiles characterized in that they are themselves capable of forming self assembled nanofibers, said amphiphiles encapsulating said carbon nanotube.

2. The composition of claim 1, wherein said amphiphile encapsulates at least a portion of said carbon nanotube.

3. The composition of claim 1, wherein said carbon nanotube is a single-walled nanotube.

4. The composition of claim 1 wherein said amphiphile has a conical molecular shape.

5. The composition of claim 1, wherein said amphiphile includes a cysteine amino acid in said amphiphile.

6. The composition of claim 5, wherein said amphiphile is bonded to another amphiphile having a cysteine amino acid in said amphiphile.

7. The composition of claim 1, wherein said amphiphile is a peptide-amphiphile or salts thereof.

8. The composition of claim 7, wherein said peptide amphiphile is comprised of an alkyl tail, a peptide spacer, and a peptide head group.

9. The composition of claim 8, wherein said head group is a steric peptide.

10. The composition of claim 1 wherein said composition is a dispersion.

11. The composition of claim 1, wherein said self-assembled nanostructure is a triblock structure.

12. The composition of claim 1, wherein said general triblock structure is D-R-C, D-C-R, or C-D-R
wherein block D is a dendritic block, R is a rigid oligomer or polymer, and block C is a flexible oligomer or polymer, and wherein in the bonds connecting the D, R, and C blocks are covalent bonds.

13. The composition of claim 1 wherein the amphiphile has an isoprene unit.

14. The composition of claim 1 wherein the amphiphile has an isoprene unit.

15. A composition comprising:
carbon nanotubes; and
a self assembled nanostructured amphiphile gel.

16. The composition of claim 15, wherein said carbon nanotube is a single-walled nanotube.

17. The composition of claim 15 wherein said amphiphile has a conical molecular shape.

18. The composition of claim 15, wherein said amphiphile includes a cysteine amino acid in said amphiphile.

19. The composition of claim 15, wherein said self-assembled nanostructure is a triblock structure.

20. A method of encapsulating a carbon nanotube comprising:
combining said carbon nanotubes with amphiphiles capable of forming a self-assembled nanofiber gels.

21. The method of claim 20 further including the act of initiating self assembly of said amphiphiles.

22. The method of claim 20, wherein said amphiphile encapsulates at least a portion of said carbon nanotube.

23. The method of claim 20 wherein said amphiphiles form a dispersion.

24. The method of claim 20, wherein said nanotube is a single-walled carbon nanotube or ropes of single walled carbon nanotubes.

25. A method of manufacturing a device which incorporates carbon nanotubes comprising
coating said carbon nanotubes with amphiphiles capable of forming self assembled nanofibers, said amphiphiles encapsulating said carbon nanotubes; and
incorporating said encapsulated nanotubes into a device.

26. The method of claim 25, wherein said amphiphiles encapsulate at least a portion of said carbon nanotube.

27. The method of claim 25, wherein said device is selected from the group consisting of scanning microscopy probes, integrated circuits, silicon based integrated circuits, metal wire coated in plastic, and coated wire.

28. A composition comprised of a combination of a carbon nanotube and a plurality of nanostructured amphiphiles, said amphiphile being capable of cross linking and said amphiphiles encapsulating said carbon nanotube.

* * * * *